Nov. 19, 1946.    F. D. HUBBELL    2,411,212
APPARATUS FOR FUMIGATING BUILDINGS
Filed May 7, 1942    2 Sheets-Sheet 1

Fred D. Hubbell INVENTOR.

BY
Victor J. Evans & Co.
ATTORNEYS

Nov. 19, 1946. F. D. HUBBELL 2,411,212
APPARATUS FOR FUMIGATING BUILDINGS
Filed May 7, 1942 2 Sheets-Sheet 2
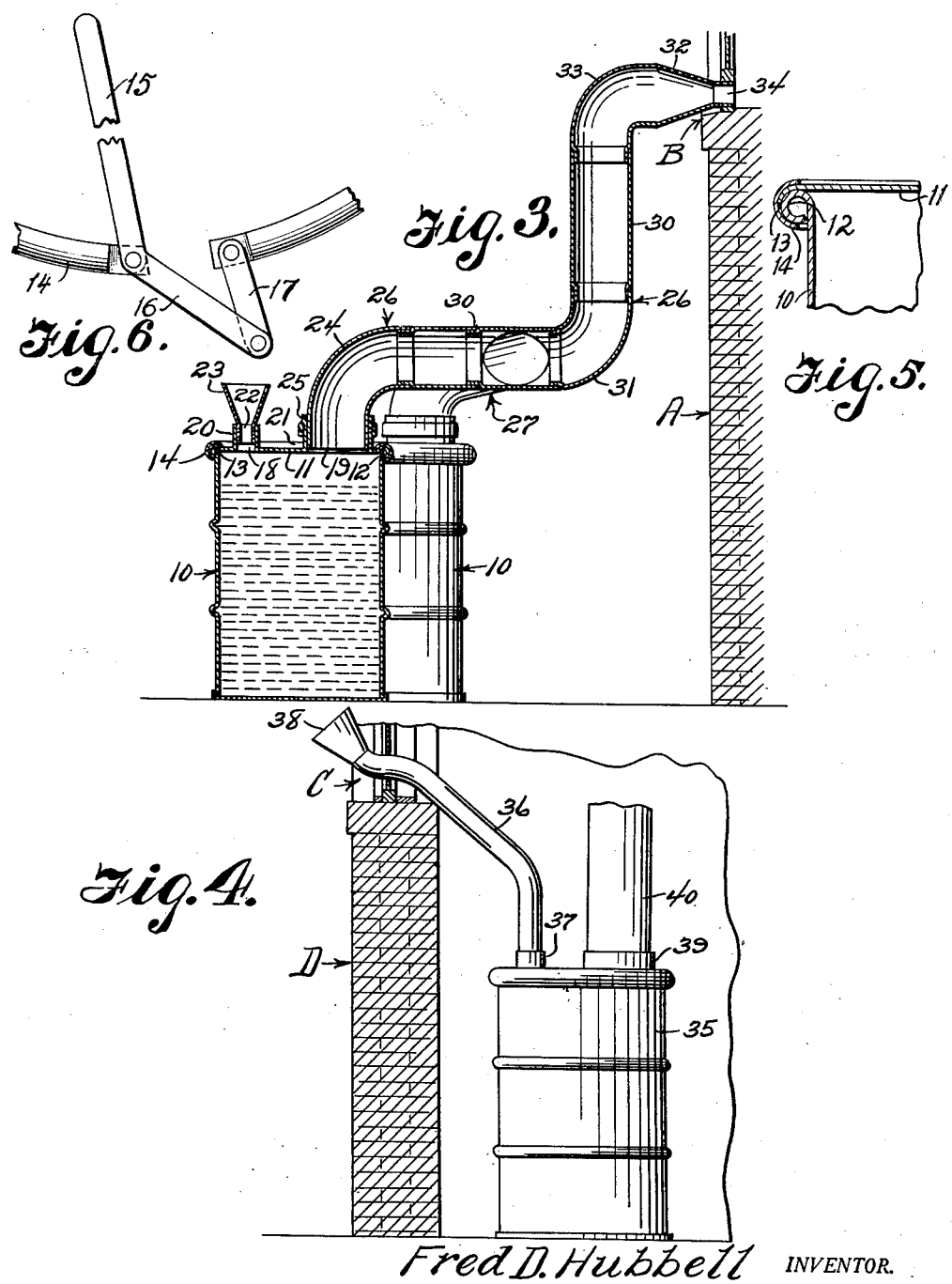
Fred D. Hubbell INVENTOR.
BY
Victor J. Evans & Co.
ATTORNEYS Patented Nov. 19, 1946

2,411,212

UNITED STATES PATENT OFFICE 2,411,212

APPARATUS FOR FUMIGATING BUILDINGS

Fred D. Hubbell, Baltimore, Md.

Application May 7, 1942, Serial No. 442,076

2 Claims. (Cl. 21—108)

This invention relates to apparatus for fumigating buildings and the like and the apparatus includes a gas generating unit or units that may be placed within or exteriorly of the building, but in any event is preferably fed at intervals with a gas forming ingredient exteriorly of the building, thus the generation of the gas is under the constant control of the operator, yet the latter is not subjected to the dangerous action of the gas which is discharged into the building in ample quantities to destroy all life therein.

A further object is to provide an apparatus, which is preferably designed for generating a powerful pressure producing fumigating agent having extremely effective life destroying properties, such as for example hydrocyanic acid gas, which is generated by using a solution of sulphuric acid and water, as two of the ingredients and sodium cyanide as the other, the latter being preferably in briquette form, commonly known as "Cyanegg," and the apparatus in any of its forms includes a container for the solution and means whereby the briquettes can be dropped into the solution to bring about the generation of the gas, which is conveyed into the building by a pipe line or a system of pipes and is forced therethrough by pressure produced by the generation of the gas and a draft created in the pipe line or system, the draft preventing the gas from passing through the inlet through which the briquettes are dropped, thus rendering the apparatus safe for the operator, who in no instance requires a gas mask when feeding the generator unit or units.

Another object is to provide an apparatus of the character set forth, that includes one or more containers, each constituting a generator unit for the gas, and they may be used individually or collectively, it depending upon the size of the area to be fumigated.

A further object is to provide a fumigating apparatus, that is simple in construction, inexpensive to manufacture, extremely efficient in use and service and can be readily installed with respect to a building.

This invention also consists in the construction of the apparatus, and in the combination and arrangement of the several parts, to be hereinafter fully described, illustrated in the accompanying drawings and specifically pointed out in the appended claims.

In describing the invention in detail, reference will be had to the accompanying drawings wherein like characters denote like or corresponding parts throughout the several views, and in which:

Figure 3 is a sectional view taken approximately on line 3—3 of Figure 1, looking in the direction of the arrows.

Figure 4 is a side elevation of a modified form installed for use.

Figure 5 is a fragmentary detailed view of the head and round flange and clamping band and Figure 6 is a fragmentary detailed view of the locking means for the band.

Figure 1:
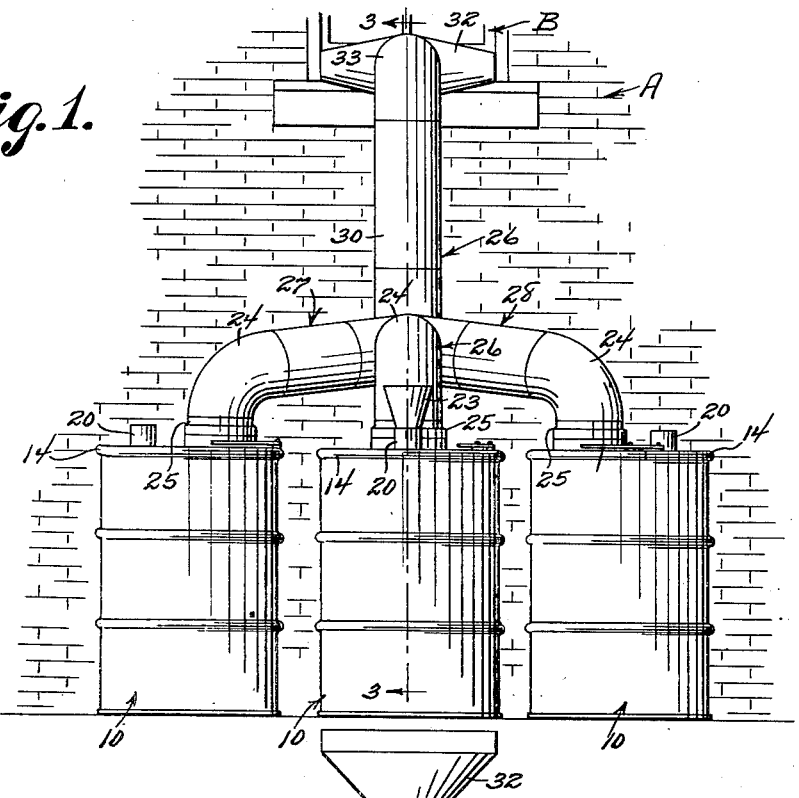
Figure 1 is a front view of one form of my apparatus and illustrates the same set up or installed with respect to a building.
Figure 2:
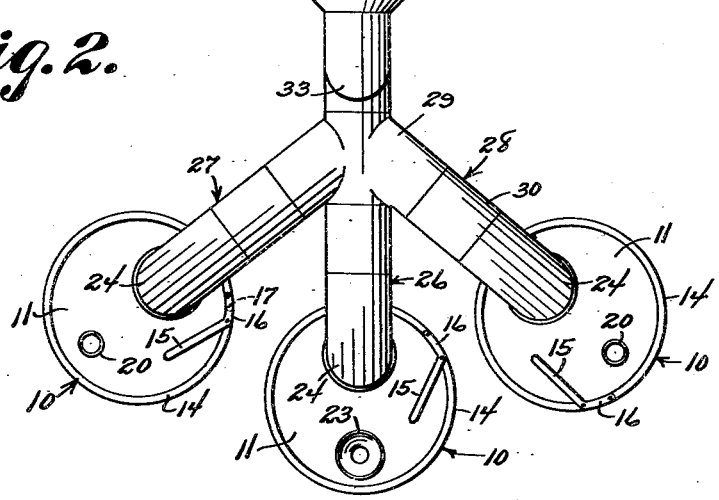
Figure 2 is a top plan view of the apparatus per se.

Referring to the drawings in detail, and particularly to the form of Figures 1 to 3, which is primarily designed for fumigating large buildings, such as warehouses, mills or the like, it will be noted that it includes three generating units, each being made up of a metallic cylindrical drum 10 having an open upper end provided with a closure in the form of a disk shaped lid 11 that is removably secured to the upper end of the drum by a suitable fastening means.

The fastening means for the lid in the form shown is provided by forming an annular or marginal bead 12 about the upper end of the drum and a marginal cross sectional rounded flange 13 about the lid, the flange fitting and mounted upon the bead. A cross sectional rounded transversely split clamping band 14 is fitted about the bead and flange. One end of the band has a bell crank lever 15 pivoted thereto at the juncture of the limbs thereof, and pivoted to the outer end of the short limb 16 is one end of a link 17 that has its opposite end pivoted to the opposite end of the band. The long limb provides a handle, and by that construction, it will be obvious that the band is disposed into and out of clamping engagement with the flange and bead upon swinging movement of the lever and pivotal movement of the link 17 secured to one end of the band 14, whereby the band is tightened in clamping engagement to hold the limb in place when the lever is in the position of Figure 2, and outward movement of the lever from that position will release the band to allow removal of the lid. While I have illustrated a particular type of fastening means for the lid, I want it understood that any other suitable means may be used for that purpose.

Each lid is provided with a small chemical inlet hole 18 and a large gas discharge or outlet hole 19. Formed on the lid and rising from about the holes are necks 20 and 21 respectively, the neck 20 being adapted to fittingly receive the outlet spout 22 of a funnel 23 and the collar or neck 21 is adapted to receive one end of an elbow 24 that forms a part of a pipe system as shown, for conveying the gas from the generating units for disposal within the building A, as will be apparent upon inspection of Figure 1. The elbow 24 fits within the neck 21 for removal therefrom and is held accordingly by a flanged collar 25 that may be slightly mounted on the elbow or fixed thereto, but in any event, the flange thereof is adapted for disposal about the neck 21 for securing the elbow thereto against casual removal or displacement.

The gas conveying pipe system is made up of a plurality of detachably connected pipe sections including the elbows 24, it being understood that an elbow 24 is provided for each container or generating unit, and while I have shown three units connected together for simultaneous use, only one or two may be used, it depending upon the area to be fumigated. In any event the pipe system in the form shown, includes a main line 26 and branch lines 27 and 28 respectively, the branch lines being connected to the main line and the latter is connected to the center unit, while the branch lines are connected to the outer units, as clearly shown in Figure 2. A Y-coupling 29 is provided for connecting the branch lines to the main line and each line includes straight pipe sections 30. The main line also includes a lower elbow 31 connected to the Y-coupling and a straight pipe section rising vertically from the elbow 31. A discharge nozzle 32 is connected to the upper end of the vertical straight section and is provided with an elbow portion 33 for that purpose, the nozzle 32 being outwardly flared laterally from the elbow portion to provide an elongated outlet that includes a marginal rectangular flange 34 for disposal in fitting engagement with the window B of the building A, as best shown in Figure 1, which also illustrates that the sash of the window is lowered on the flange 34 to hold the nozzle relatively fixed in the window.

The joints of the pipe sections are preferably sealed with tape or the like, and suitable means is provided for sealing the joint between the discharge nozzle 32 and the window, to prevent the escape of gas, as will be apparent.

While I have shown and illustrated a particular pipe system, it will of course be understood that the system will be varied as to the number of pipe sections and the arrangement thereof, in accordance with the installation of the apparatus with respect to different types of buildings, and the position of the windows or like openings relative to the ground level. The discharge nozzle may likewise be eliminated and in that event an elbow will be substituted therefor and sealed with respect to the window or other opening in the building wall, by any suitable means.

From the foregoing and disclosure in the drawings, it will be seen that the apparatus of the form of Figures 1 to 3 is primarily designed to be entirely disposed exteriorly of the buildings and discharges gas within the building. That feature renders the apparatus safe in every respect, so that the gas producing chemicals can be fed to the containers or units, as previously indicated to generate the gas.

When it is desired to use the apparatus for generating hydrocyanic acid gas, for which my apparatus is primarily designed, the desired quantity of sulphuric acid and water solution is disposed in one or all of the containers, through the neck inlet openings or holes of the lids, the funnels being used for that purpose, and then sodium cyanide is dropped through the funnels into the solution at regular intervals to generate the gas, as will be apparent. The generation of the gas of course produces ample pressure for forcing the same through the pipe sections and due to the fact that an upward draft is created in the system, particularly by the use of the vertical portion of the main line, the gas is drawn therethrough, therefore a minimum amount of gas if any, will escape through the inlet openings of the units. In fact, in practice it has been found that it is unnecessary for the operator to use a gas mask while feeding the sodium cyanide to the apparatus. The sodium cyanide is preferably used in briquette form, commercially known as "Cyanegg," as previously set forth, and it can be readily handled with rubber gloves when in that form, without injury to the operator.

The form of Figure 4 includes a single container or generating unit 35 exactly like the units of the form of Figures 1 to 3, but the method of fumigation of the form of Figure 4 is different from that of the other form, in that the unit 35 is disposed within the building, with a pipe 36 connected to the neck 37 of the small inlet opening, the pipe 36 extending through a window opening C in the building D and has a funnel shaped inlet end 38, through which the "Cyanegg" briquettes are dropped by the operator while standing exteriorly of the building D for disposal of the briquettes through the pipe 36 and into the sulphuric acid and water solution within the unit 35. The large necked outlet opening 39 preferably has a pipe 40 secured thereto and rising therefrom, to prevent froth that is produced by the generation of the gas from overflowing on the floor of the building, as will be apparent.

It is thought from the foregoing description that the advantages and novel features of the invention will be readily apparent.

It is to be understood that changes may be made in the construction of the apparatus, and in the combination and arrangement of the several parts, provided that such changes fall within the scope of the appended claims.

What I claim is:

1. An apparatus for fumigating a building, comprising a container for initially receiving gas producing ingredients and having an open upper end, a lid closing the upper end and removably secured thereto, said lid being provided with a relatively small inlet opening and a relatively large outlet opening for the container, a neck for each opening and secured to and rising from the lid, open funnel means adapted to be inserted in the neck of the inlet opening for passage of an additional ingredient therethrough for disposal in the container to mix with the first ingredients to generate gas, a sectional sealed pipe line having one end connected to the neck of the outlet opening for conveying the gas for discharge into the building, said pipe line including a vertical portion to create a draft therein, and a discharge nozzle secured to the outlet end of the pipe line and being of elongated formation to fit within a window of the building to discharge the gas into the building.

2. An apparatus for fumigating a building, comprising a plurality of containers for initially receiving gas producing ingredients and for disposal exteriorly of the building, each container having an open upper end, a closure for the open end, means detachably securing the closure to said end, each closure having a relatively small inlet normally open to the atmosphere and a relatively large outlet for the container, said inlet being adapted for introducing an additional ingredient within the container to mix with the first ingredients to generate gas, a sectional sealed main pipe line connected to the outlet of the closure of one container for conveying the gas to and into the building, sectional branch pipe lines connected to the outlets of the other containers, a multiple branch coupling in said main pipe line and having the branch lines connected thereto, the main pipe line having a vertically extending portion above the points of juncture of the branch pipe lines therewith, and a discharge nozzle connected to the upper end of the vertical portion.

FRED D. HUBBELL.